(12) United States Patent
Nakatani et al.

(10) Patent No.: US 7,117,753 B2
(45) Date of Patent: Oct. 10, 2006

(54) TORQUE DETECTING APPARATUS

(75) Inventors: Norio Nakatani, Nabari (JP); Takahiro Sanada, Kashihara (JP); Masayuki Yamamoto, Toshima-ku (JP)

(73) Assignees: Koyo Seiko Co., Ltd., Osaka (JP); Finesinter Co., Ltd., Tokyo (JP)

( * ) Notice: Subject to any disclaimer, the term of this patent is extended or adjusted under 35 U.S.C. 154(b) by 0 days.

(21) Appl. No.: 11/033,172

(22) Filed: Jan. 12, 2005

(65) Prior Publication Data
US 2005/0150312 A1 Jul. 14, 2005

(30) Foreign Application Priority Data
Jan. 13, 2004 (JP) ............... 2004-006095

(51) Int. Cl.
G01L 3/02 (2006.01)
G01L 3/10 (2006.01)
G01L 3/12 (2006.01)
G01L 3/14 (2006.01)

(52) U.S. Cl. ................................. 73/862.331
(58) Field of Classification Search .............. None
See application file for complete search history.

(56) References Cited
U.S. PATENT DOCUMENTS 6,006,854 A * 12/1999 Nakajima ............... 180/446
6,467,567 B1 * 10/2002 Kobayashi et al. ......... 180/444
6,538,546 B1    3/2003 Serino et al.
6,557,425 B1 *  5/2003 Kamiya et al. ......... 73/862.334
6,926,115 B1 *  8/2005 Masaki et al. ............ 180/446

FOREIGN PATENT DOCUMENTS
JP    2002-13990 A    1/2002

* cited by examiner

Primary Examiner—Max Noori
Assistant Examiner—Octavia Davis
(74) Attorney, Agent, or Firm—Birch, Stewart, Kolasch and Birch, LLP

(57) ABSTRACT

The torque detecting apparatus comprises an input shaft to which a torque is inputted, an output shaft for outputting the inputted torque, a connecting shaft for connecting the input shaft and the output shaft to transmit the torque, a coil for detecting a torque applied from the input shaft to the connecting shaft based on a torsional angle which arises at the connecting shaft, and a holding cylinder for holding the coil coaxially, wherein the holding cylinder has inside thereof a recess extending in the circumferential direction, and the coil is fitted in the recess. Projections for supporting the holding cylinder at a predetermined position are provided on the outer surface of an axial portion which does not have the recess. Accurate torque detection can be effected even when pressure applied to the projections provided at the holding cylinder constituting the torque detecting apparatus is changed.

6 Claims, 5 Drawing Sheets

TORQUE DETECTING APPARATUS

CROSS-REFERENCE TO RELATED APPLICATIONS

This Nonprovisional application claims priority under 35 U.S.C. §119(a) on Patent Application No. 2004-6095 filed in Japan on Jan. 13, 2004, the entire contents of which are hereby incorporated by reference.

BACKGROUND OF THE INVENTION

The present invention relates to a torque detecting apparatus, and in particular to a noncontact torque detecting apparatus for detecting a torque applied to a connecting shaft by detecting a torque inputted into an input shaft as a change in the inductance of a coil due to torsion which arises at the connecting shaft.

A torque detecting apparatus comprises: an input shaft to which a torque is inputted; an output shaft for outputting the inputted torque; a connecting shaft of a torsion bar for connecting the input shaft and the output shaft; and a coil, which surrounds the connecting shaft, the input shaft and the output shaft, for detecting a torque applied from the input shaft to the connecting shaft based on a torsional angle which arises at the connecting shaft. The input shaft and the output shaft respectively comprise a detection ring made of magnetic material on the outer circumference thereof, wherein when a torque is inputted into the input shaft, the connecting shaft is tortured, so that the relative positions of two detection rings in the circumferential direction are changed and the inductance of the coil surrounding the connecting shaft, the input shaft and the output shaft is changed. By detecting this change in the inductance as a change in the impedance of a coil connected to an AC circuit, a torque which is inputted into or outputted from the input shaft and the output shaft and applied to the connecting shaft is detected. The coil is held coaxially in a holding cylinder formed of green compact and engaged in a recess extending over the entire circumference of the inner surface of the holding cylinder.

By the way, the holding cylinder comprises on the outer surface thereof a projection for locating the holding cylinder at a predetermined position, the projection being formed over an area between the annular faces of the holding cylinder in a conventional torque detecting apparatus. The projection is a strip formed integrally with coating member made of synthetic resin for coating the holding cylinder (Japanese Patent Application Laid-Open No. 2002-13990).

A torque detecting apparatus constructed in such a manner is used in a vehicle electric power steering apparatus, for example. That is, the apparatus is used for detecting a torque which is inputted into the input shaft connected to a steering wheel for operating the vehicle by rotation of the steering wheel. Attachment of the torque detecting apparatus is effected by bringing the projection of the torque detecting apparatus into contact with the inner circumferential surface of a hollow housing constituting the electric power steering apparatus and fitting the torque detecting apparatus fixedly.

It should be noted that green compact has an electric resistance higher than that of iron, stainless steel or the like. Accordingly, by forming the holding cylinder with green compact, eddy current to be caused in the holding cylinder by current passing through the coil can be decreased and the detection accuracy of torque can be enhanced in comparison with a case where the holding cylinder is formed of iron, stainless steel or the like.

However, when an electric power steering apparatus is used, the temperature of the torque detecting apparatus and the housing is changed in a large way from ordinary temperature. When the temperature is changed, the housing and the torque detecting apparatus expand or contract in different ratios due to a difference in the coefficients of linear expansion of members constituting the housing and the torque detecting apparatus, so that a large pressure, i.e. a pressure larger than a pressure which is to be applied to the projection at ordinary temperature, is applied to the projection provided at the holding cylinder. In particular, when the temperature is low, a housing made of aluminum contracts more than the torque detecting apparatus and a large pressure is applied to the projection. When pressure in the radial direction of the holding cylinder is applied to the projection, the holding cylinder is deformed and the inductance of the coil is changed, so that the detected value of torque is changed. Thus, a conventional torque detecting apparatus has a problem that the torque detection becomes inaccurate when pressure applied to the projection for supporting the torque detecting apparatus at a predetermined position is changed.

When a torque detecting apparatus is used in an electric power steering apparatus, if a change in the temperature of the vehicle makes the torque detection inaccurate, the operations of the electric power steering apparatus for assisting steering based on the detected value of torque also becomes inaccurate, giving rise to deterioration of feeling in steering the vehicle.

There is another problem that the green compact forming the holding cylinder has a low strength and, in particular, a portion of the holding cylinder having the recess has a small thickness, so that this portion of the holding cylinder might be damaged while pressing the torque detecting apparatus into the housing and the torque detecting apparatus cannot be pressed into the housing with a large force.

When the torque detecting apparatus cannot be pressed into the housing with a large force, it is impossible to bring the projection into contact with the inner circumferential surface of the housing with a large force, so that the torque detecting apparatus cannot be attached in a stable manner.

BRIEF SUMMARY OF THE INVENTION

The present invention has been made with the aim of solving the above problems, and it is an object thereof to provide a torque detecting apparatus which can effect torque detection accurately even when pressure applied to a projection provided at the torque detecting apparatus is changed, and the possibility for damage is low even when a large pressure or impact is applied to the projection.

A torque detecting apparatus according to the present invention is a torque detecting apparatus comprising: an input shaft to which a torque is inputted; an output shaft for outputting the torque inputted into the input shaft; a connecting shaft for connecting the input shaft and the output shaft to transmit the torque; a coil for detecting a torque applied to the connecting shaft based on a torsional angle which arises at the connecting shaft; and a holding cylinder for holding the coil coaxially, the holding cylinder having inside thereof a recess extending in the circumferential direction, the coil being fitted in the recess, wherein the holding cylinder comprises a projection on the outer surface of an axial portion which does not have the recess.

According the present invention, the axial portion of the holding cylinder which does not have the recess, i.e. a portion which does not have a recess inside thereof, has a thickness larger than a portion which has the recess inside thereof. Consequently, when pressure in the radial direction of the holding cylinder is applied to the projection, the stress applied from the projection to the holding cylinder is dispersed widely in comparison with a holding cylinder comprising a projection on an outer surface portion having a recess inside thereof, so that deformation of the holding cylinder due to the stress can be suppressed. Accordingly, a change in the inductance of the coil due to a change in the pressure applied to the projection can be suppressed. Moreover, when pressure in the radial direction of the holding cylinder is applied to the projection, the stress applied to the holding cylinder is dispersed widely in comparison with a holding cylinder comprising a projection on an outer surface portion having a recess inside thereof. Accordingly, the possibility for damage to the holding cylinder is low even when a large pressure in the radial direction of the holding cylinder is applied to the projection during attaching the torque detecting apparatus at a predetermined position.

A torque detecting apparatus according to the present invention is a torque detecting apparatus comprising: an input shaft to which a torque is inputted; an output shaft for outputting the torque inputted into the input shaft; a connecting shaft for connecting the input shaft and the output shaft to transmit the torque; a coil for detecting a torque applied to the connecting shaft based on a torsional angle which arises at the connecting shaft; a compensating coil for applying temperature compensation to torque detection by the coil; and a holding cylinder for holding, respectively, the coil and the compensating coil coaxially, the holding cylinder having inside thereof two recesses extending in the circumferential direction, the coil being fitted in one of the recesses, the compensating coil being fitted in the other of the recesses, wherein the holding cylinder comprises a projection on the outer surface of an axial portion which separates the two recesses.

According to the present invention, when pressure in the radial direction of the holding cylinder is applied to the projection, the stress applied to the holding cylinder is applied evenly to the two recesses centering around the axial portion which separates the two recesses. Accordingly, the effect of the pressure applied to the projection is applied evenly to the coil and the compensating coil respectively and a change in the inductance of the coil due to the pressure is at the same level as a change in the inductance of the compensating coil. Consequently, the value of the inductance of the coil with respect to the compensating coil is not changed in a large way even when pressure in the radial direction of the holding cylinder is changed.

In the torque detecting apparatus according to the present invention, the holding cylinder is composed of a hollow and disciform intermediate and two cylinder portions sandwiching the intermediate coaxially, the intermediate constituting the axial portion which separates the two recesses.

According to the present invention, a holding cylinder can be constructed by holding the coil and the compensating coil in the two cylinder portions and interposing the intermediate between the two cylinder portions, so that the coil and the compensating coil can be held in the holding cylinder easily.

In the torque detecting apparatus according to the present invention, the holding cylinder comprises a plurality of projections which are arranged at regular intervals in the circumferential direction of the holding cylinder.

According to the present invention wherein a plurality of projections are arranged at regular intervals in the circumferential direction of the holding cylinder, when pressure at the same level is applied to the respective projections, the stress applied to the holding cylinder is dispersed widely and equally in comparison with a holding cylinder provided with a plurality of projections arranged at irregular intervals in the circumferential direction of the holding cylinder. Accordingly, deformation of the holding cylinder due to the pressure and a change in the inductance of the coil due to the deformation can be suppressed.

With the torque detecting apparatus according to the present invention, the detected value of torque does not fluctuate even when the pressure applied to the projection is changed, so that a torque inputted into the input shaft can be detected accurately. For example, when the torque detecting apparatus is supported within a housing constituting an electric power steering apparatus, the detected value of torque does not fluctuate even when the temperature of the electric power steering apparatus and the torque detecting apparatus is changed, so that a torque inputted into the input shaft can be detected accurately and favorable feeling in steering can be maintained. Moreover, the holding cylinder can be free from the possibility of damage due to a large pressure or impact applied to the projection. For example, during attaching the torque detecting apparatus within a housing constituting an electric power steering apparatus, the holding cylinder can be pressed into the housing with a large force, so that the torque detecting apparatus can be attached in a stable manner. Furthermore, the coil and the compensating coil can be held in the holding cylinder easily, so that the torque detecting apparatus can be assembled effectively.

The above and further objects and features of the invention will more fully be apparent from the following detailed description with accompanying drawings.

DETAILED DESCRIPTION OF THE INVENTION

The following description will explain the present invention in detail with reference to the drawings illustrating an embodiment thereof.

Figure 1:
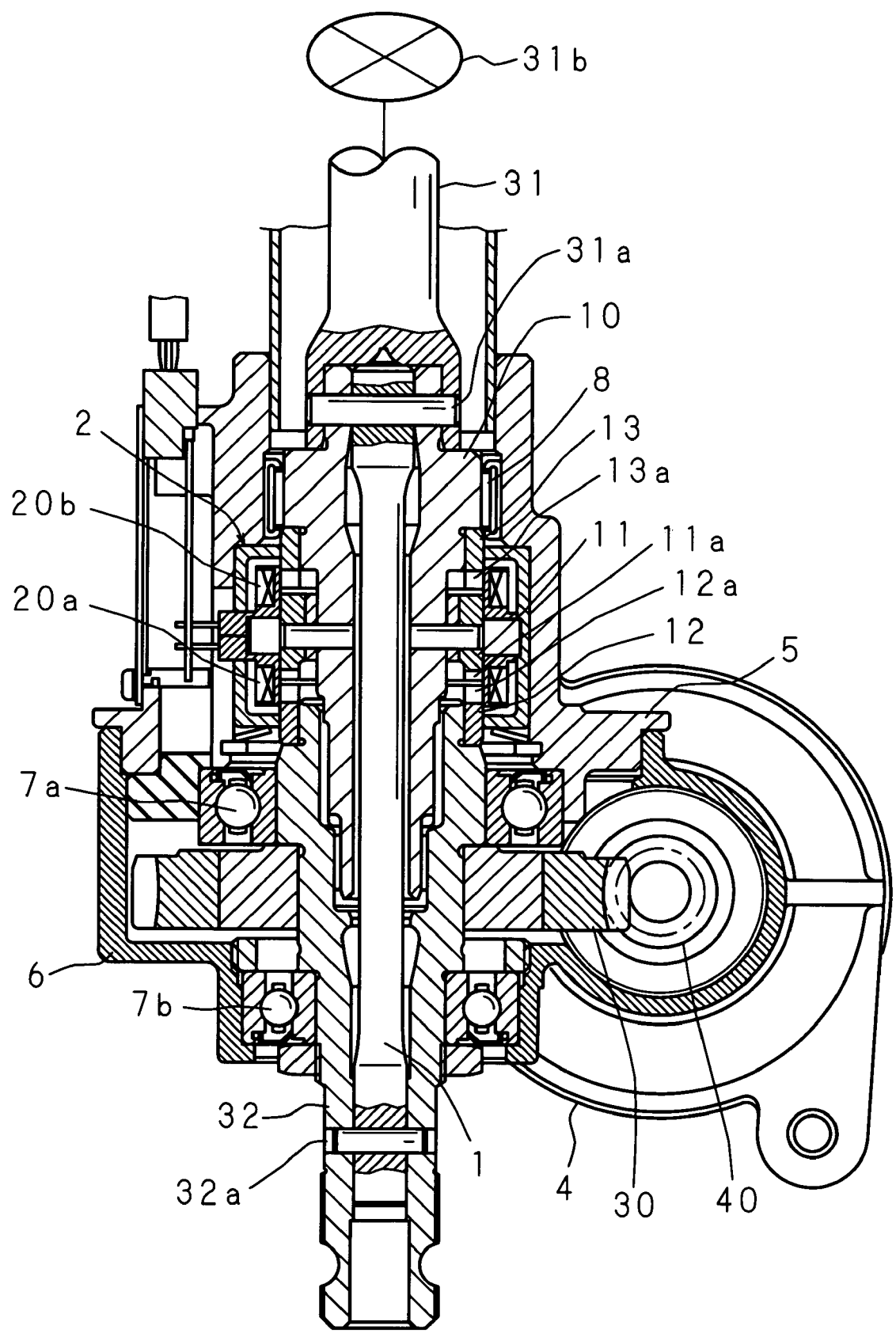
FIG. 1 is a schematic sectional view of an electric power steering apparatus comprising a torque detecting apparatus according to the present invention, seen from a side of a vehicle.

FIG. 1 is a schematic sectional view of an electric power steering apparatus comprising a torque detecting apparatus according to the present invention, seen from a side of a vehicle. The torque detecting apparatus according to the present invention comprises: an input shaft 10 to which a torque is inputted; an output shaft 32 for outputting the torque inputted into the input shaft 10; a connecting shaft 1 of a torsion bar for connecting the input shaft 10 and the output shaft 32 to transmit the torque; a coil 20a for detecting a torsional angle of the connecting shaft 1 which arises due to a torque applied to the connecting shaft 1; a compensating coil 20b for applying temperature compensation to the torque detection by the coil 20a; and a holding cylinder 2 for holding, respectively, the coil 20a and the compensating coil 20b coaxially. The torque detecting apparatus is incorporated in an electric power steering apparatus and is constructed to detect a torque inputted into the electric power steering apparatus.

Figure 2:
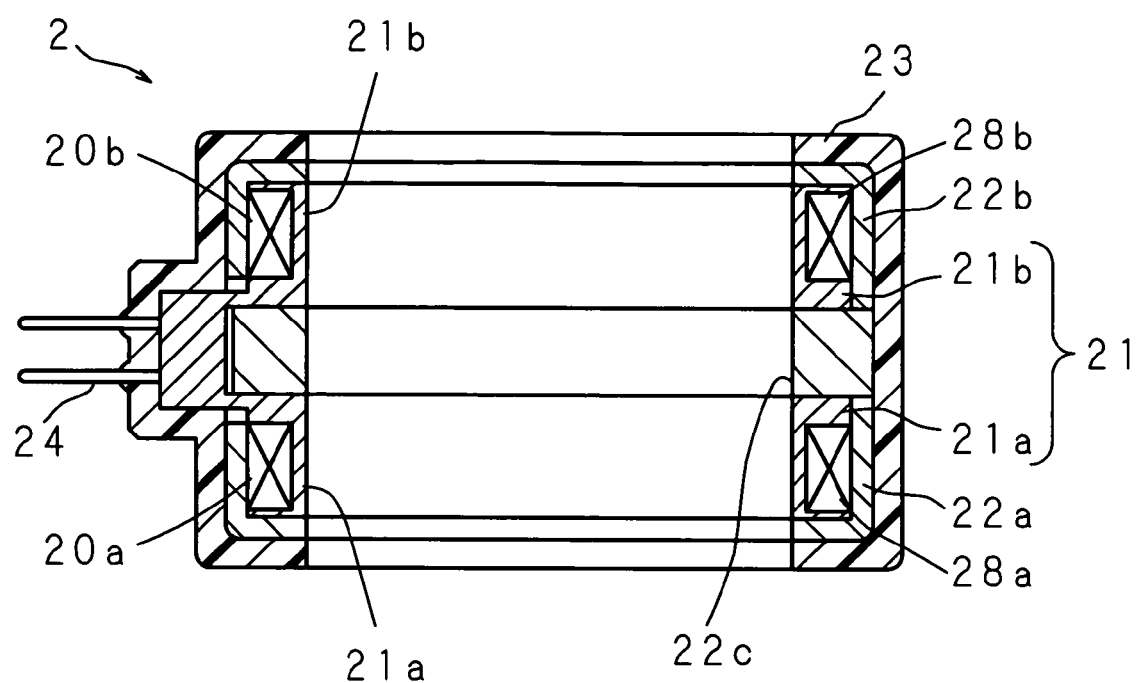
FIG. 2 is a sectional view showing a holding cylinder holding a coil and a compensating coil provided at a torque detecting apparatus according to the present invention, schematically on a plane including the axis of the holding cylinder.

The following description will explain the torque detecting apparatus. FIG. 2 is a sectional view showing a holding cylinder 2 holding the coil 20a and the compensating coil 20b provided at the torque detecting apparatus according to the present invention, schematically on a plane including the axis of the holding cylinder 2. The holding cylinder 2 is composed of a hollow and disciform intermediate 22c, and a first cylinder portion 22a and a second cylinder portion 22b which are two cylinder portions sandwiching the intermediate 22c, and has two recesses 28a and 28b, in which the coil 20a and the compensating coil 20b are fitted, extending over the entire circumference of the inner surface thereof.

A coil bobbin 21 which is an insulator has a cylindrical first coil bobbin 21a and a second coil bobbin 21b shaped similarly as the first coil bobbin 21a coaxially at a predetermined interval. The coil 20a is winded around the first coil bobbin 21a while the compensating coil 20b is winded around the second coil bobbin 21b. The coil 20a is surrounded by the first cylinder portion 22a while the compensating coil 20b is surrounded by the second cylinder portion 22b shaped similarly as the first cylinder portion 22a. The hollow and disciform intermediate 22c is interposed between the first coil bobbin 21a and the second coil bobbin 21b as a spacer. The outside diameter of the first and second cylinder portions 22a and 22b and of the intermediate 22c is at the same level, the inside diameter of the first and second cylinder portions 22a and 22b is decreased at end portions of the holding cylinder 2, and the inside diameter of the intermediate 22c is at the same level as the inside diameter of one end portion of the first cylinder portion 22a having a decreased diameter. The first and second cylinder portions 22a and 22b and the intermediate 22c are formed of green compact of soft magnetic powder, and the outer surface of the holding cylinder 2 is coated with a coating member 23 made of synthetic resin such as phenolic resin or polyamide. Lead wires constituting the coil 20a and the compensating coil 20b are connected to a terminal 24 which is connected to an outer AC circuit.

Figure 3A:
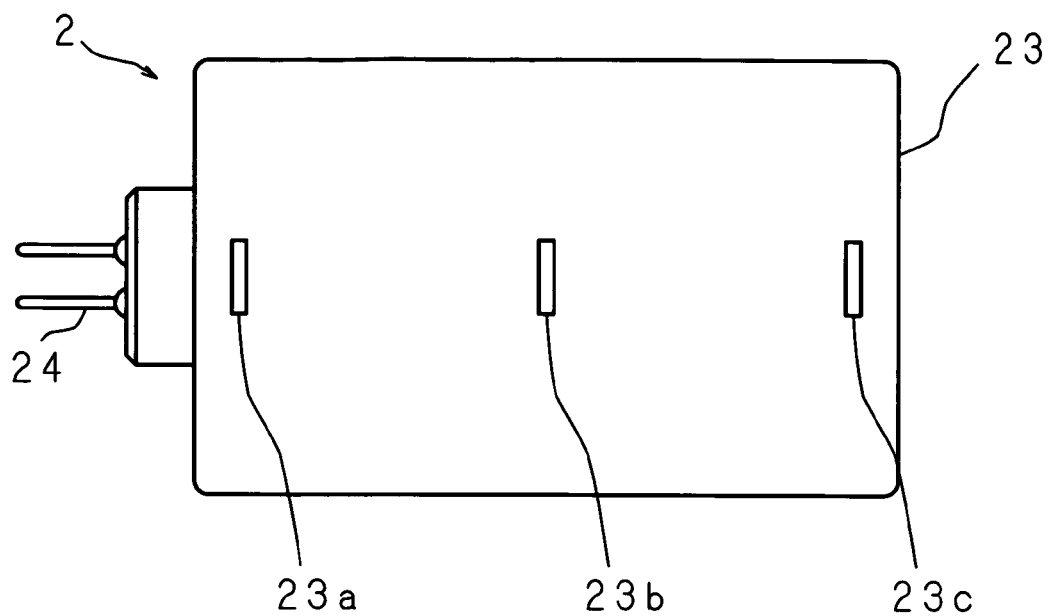
FIG. 3A is a side view showing the holding cylinder schematically.
Figure 3B:
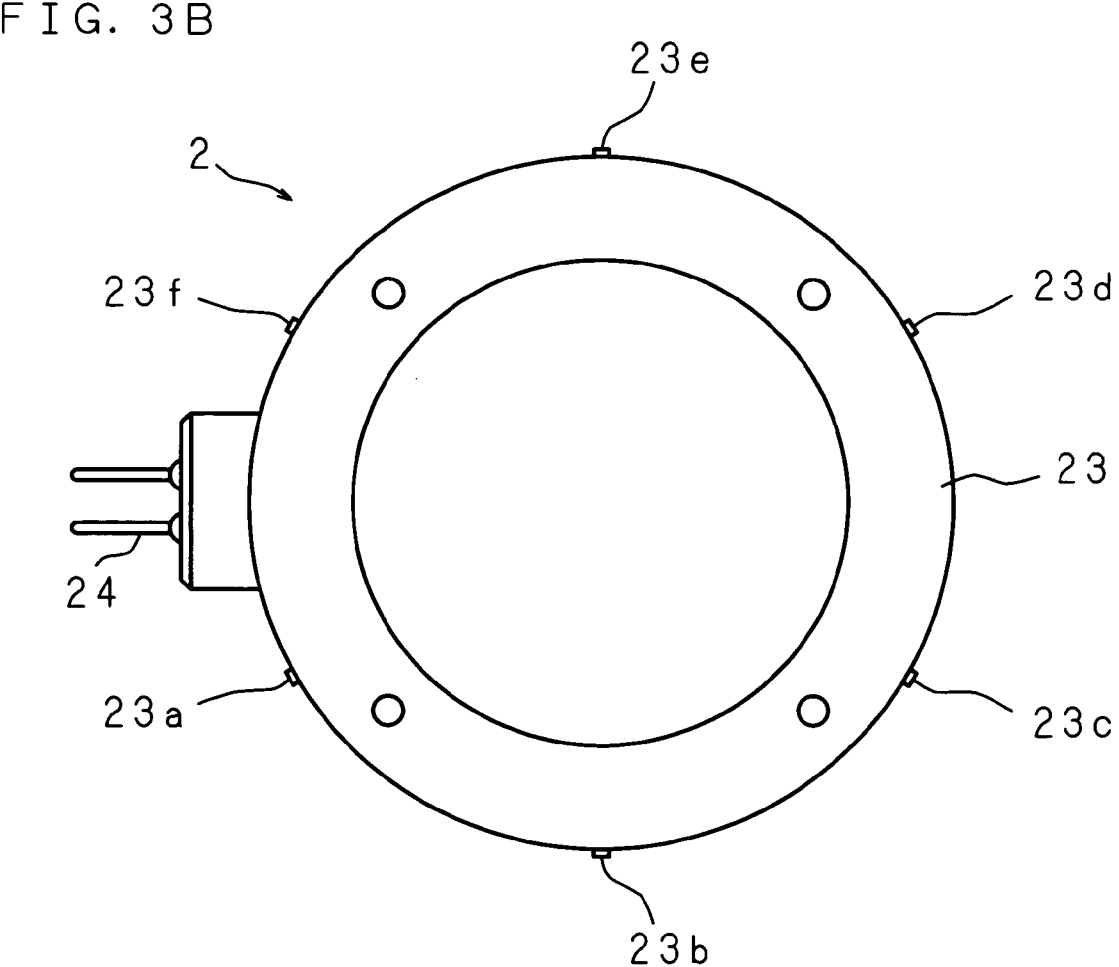
FIG. 3B is a top view showing the holding cylinder schematically.

FIG. 3A is a side view showing the holding cylinder 2 schematically and FIG. 3B is a top view of the holding cylinder 2, i.e., a plan view of the holding cylinder 2 seen from the annular face side. The holding cylinder 2 comprises six projections 23a–23f on the outer circumferential surface of an axial portion which separates the two recesses 28a and 28b, i.e. at the outer circumferential surface side of the intermediate 22c, the projections 23a–23f being arranged at regular intervals in the circumferential direction of the holding cylinder 2. The projections 23a–23f are strips parallel to the axis of the holding cylinder 2 and has an axial length at the same level as the axial thickness of the intermediate 22c. The projections 23a–23f are made of synthetic resin and formed integrally with the coating member 23.

Figure 4:
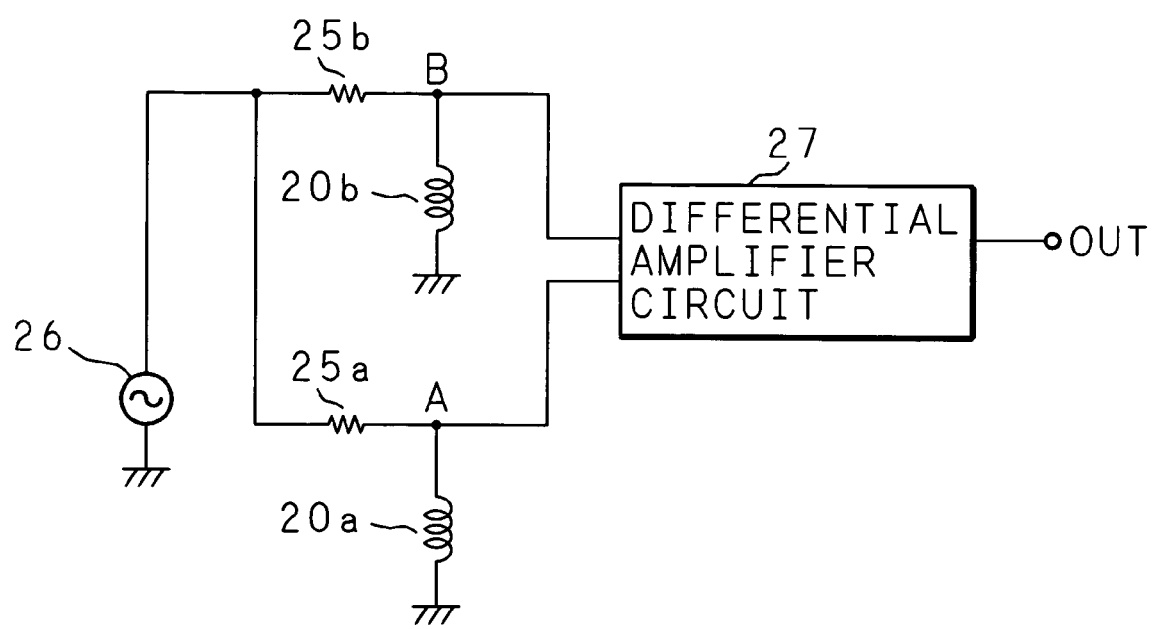
FIG. 4 is a circuit diagram showing an AC circuit for detecting a torque.

FIG. 4 is a circuit diagram showing the AC circuit, which is connected to the coil 20a and the compensating coil 20b, for detecting a torque. One end of a lead wire constituting the coil 20a is grounded while the other end is connected to an oscillator 26 via an electric resistance 25a. Similarly, one end of a lead wire constituting the compensating coil 20b is grounded while the other end is connected to the oscillator 26 via an electric resistance 25b. The sign 27 in the figure denotes a differential amplifier circuit for outputting a signal corresponding to the potential difference between a point A and a point B. The point A is on wiring connecting the coil 20a and the electric resistance 25a while the point B is on wiring connecting the compensating coil 20b and the electric resistance 25b.

Next, an electric power steering apparatus comprising the torque detecting apparatus will be explained with reference to FIG. 1. The connecting shaft 1 constituting the torque detecting apparatus is fitted in the hollow input shaft 10, the upper end portions of the connecting shaft 1 and the input shaft 10 are fitted coaxially in a cylindrical portion of an upper shaft 31, and a pin 31a is fitted into a pin hole which penetrates the upper shaft 31, the input shaft 10 and the connecting shaft 1 respectively. The lower end portions of the connecting shaft 1 and the input shaft 10 are fitted coaxially in the hollow output shaft 32 and a pin 32a is fitted into a pin hole which penetrates the output shaft 32 and the connecting shaft 1. The input shaft 10 and the output shaft 32 are not rotated integrally though they are arranged coaxially via a bush, and the input shaft 10 and the output shaft 32 are constructed to be shifted relatively in the circumferential direction when the connecting shaft 1 is tortured. The upper shaft 31 comprises a steering wheel 31b at an upper portion thereof and the output shaft 32 is connected to a steering mechanism for directing a vehicle, such as a rack and pinion steering mechanism (not illustrated). The output shaft 32 comprises a gear wheel 30 which is a worm wheel pressed into the outer circumferential surface, and is connected to a motor 4 via a pinion 40 which is a worm engaged perpendicularly with the gear wheel 30.

The sign 5 in FIG. 1 denotes a sensor housing for holding the holding cylinder 2, the connecting shaft 1 and the like, and is engaged with a gear housing 6 for holding the gear wheel 30, the pinion 40 and the like. The sensor housing 5 and the gear housing 6 are respectively formed of aluminum. The holding cylinder 2 is supported on the inner surface of the hollow sensor housing 5 via the projections 23a–23f. The input shaft 10 surrounded by the holding cylinder 2 is supported within the sensor housing 5 via a bearing 8 and the output shaft 32 is supported within the sensor housing 5 and the gear housing 6 via antifriction bearings 7a and 7b. The motor 4 is attached to the gear housing 6, and the output shaft of the motor 4 having the pinion 40 is supported within the gear housing 6 via an antifriction bearing which is not illustrated.

The input shaft 10 comprises a first detection ring 11 made of magnetic material on the outer circumference thereof while the output shaft 32 comprises a second detection ring 12 made of magnetic material, which faces the first detection ring 11, on the outer circumference thereof. The first detection ring 11 and the second detection ring 12 respectively have teeth 11a and 12a arranged on the annular faces facing each other at regular intervals in the circumferential direction. The input shaft 10 further comprises an annular third detection ring 13 made of magnetic material which faces the first detection ring 11, and only the third detection ring 13 has teeth 13a arranged on an annular face facing the first detection ring 11 at regular intervals in the circumferential direction. The first and second detection rings 11 and 12 are attached so that portions facing each other are surrounded by the coil 20a while the first and third detection rings 11 and 13 are attached so that portions facing each other are surrounded by the compensating coil 20b.

In the electric power steering apparatus constructed in such a manner, rotation of the steering wheel 31b is transmitted to the steering mechanism via the input shaft 10, the connecting shaft 1 and the output shaft 32, so as to direct the vehicle. When a torque is inputted into the input shat 10 by rotation of the steering wheel 31b, the motor 4 is driven and rotation of the motor 4 is transmitted to the output shaft 32 via the pinion 40 and the gear wheel 30 having a reduced speed, so that the rotation movement of the steering wheel 31b is assisted. The motor 4 is controlled based on the torque inputted into the input shaft 10, which is detected by the torque detecting apparatus.

The operations of the torque detecting apparatus will be explained with reference to FIGS. 1 and 4. The impedance of the coil 20a in the AC circuit depends on the coil 20a, the input shaft 10, the output shaft 32, the holding cylinder 2, the frequency of the oscillator 26 and the like. By the way, when a torque is inputted from the steering wheel 31b into the input shaft 10, the connecting shaft 1 is tortured, so that the relative positions of the input shaft 10 and the output shaft 32 are changed in the circumferential direction and the relative positions of the first detection ring 11 and the second detection ring 12 are also changed. Accordingly, the facing relation between the teeth 11a and 12a provided at the first and second detection rings 11 and 12 is also changed, so that the impedance of the coil 20a is changed. The change in the impedance can be detected as a change in the potential of the point A in the AC circuit, and the torque which is inputted into the input shaft 10 and applied to the connecting shaft 1 can be detected based on the change in the potential of the point A.

Moreover, though the impedance of the coil 20a is changed when the temperature is changed, temperature compensation is applied to the change by a change in the impedance of the compensating coil 20b. Though the impedance of the compensating coil 20b depends on the input shaft 10, the holding cylinder 2 and the like similarly as the coil 20a, the facing relation between the first and third detection rings 11 and 13 is not changed even when the connecting shaft 1 is tortured by the torque, and the impedance of the compensating coil 20b is changed exclusively based on a change in the temperature. Since the compensating coil 20b has substantially the same structure as the coil 20a, the change in the impedance of the compensating coil 20b due to a change in the temperature is at the same level as a change in the impedance of the coil 20a. Accordingly, constant torque detection independent of the temperature can be effected by detecting a potential difference between the potential of the point B associated with the compensating coil 20b and the potential of the point A associated with the coil 20a with the differential amplifier circuit 27.

Figure 5:
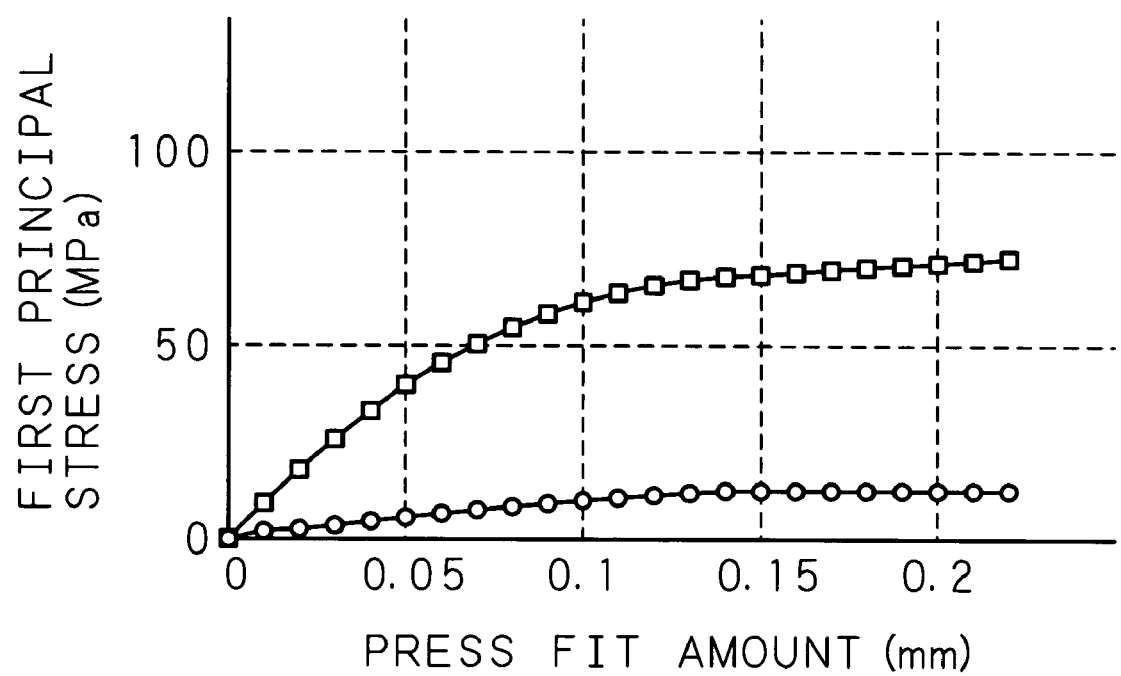
FIG. 5 is a graph showing the relation between the press fit amount of the torque detecting apparatus with respect to a sensor housing and the first principal stress applied to the holding cylinder.

Next, the stress applied to the holding cylinder 2 when the torque detecting apparatus is pressed into the sensor housing 5 will be explained. FIG. 5 is a graph showing the relation between the press fit amount of the torque detecting apparatus with respect to the sensor housing 5 and the first principal stress applied to the holding cylinder 2. FIG. 5 shows the result of FEM analysis (Finite Element Method analysis) for a case where the outside diameter of the holding cylinder 2 is 43 mm, the inside diameter of the end portions of the holding cylinder 2 is 31.5 mm, the outside diameter of the portion having projections 23a–23f is 45.08 mm, the height of the first cylinder portion 22a is 12.5 mm, the inside diameter of the portion of the first cylinder portion 22a having a recess 28a is 40 mm, the axial width of the recess 28a is 9.5 mm, the axial thickness of the intermediate 22c is 5 mm, the inside diameter thereof is 31.5 mm and six projections are arranged on the outer circumference of the holding cylinder 2 at regular intervals. Circles denote the analysis result of a case where projections are provided at the outer surface of the intermediate 22c while squares denote the analysis result of a case where projections are provided at an outer surface portion having the recess 28a inside thereof. The total area of the projections is the same in both cases. The result in FIG. 5 shows that the first principal stress applied to the holding cylinder 2 in a case where projections are provided on the outer surface of the intermediate 22c is approximately the sixth part of that of a case where projections are provided on the outer surface portion having the recess 28a inside thereof.

In the torque detecting apparatus according to the present invention, the radial thickness of the intermediate 22c provided with the projections 23a–23f is larger than the thickness of axial portions of the first and second cylinder portions 22a and 22b having the recesses 28a and 28b. Accordingly, the stress applied to the intermediate 22c is dispersed widely and deformation of the holding cylinder 2 is suppressed even when pressure in the radial direction of the holding cylinder 2 is applied to the projections 23a–23f, so that a change in the inductance of the coil 20a can be suppressed and further accurate torque detection can be affected even when pressure applied to the projections 23a–23f is changed.

Moreover, since the projections 23a–23f are provided on the outer circumference of the intermediate 22c interposed between the first and second cylinder portions 22a and 22b, the stress applied to the intermediate 22c is dispersed substantially evenly to the first cylinder portion 22a and the second cylinder portion 22b centering around the intermediate 22c even when pressure in the radial direction of the holding cylinder 2 is applied to the projections 23a–23f. Accordingly, the effect of the pressure applied to the projections 23a–23f, i.e. a change in the inductance, is applied to both of the coil 20a and the compensating coil 20b, so that the effect to the coil 20a due to the pressure is cancelled out by the compensating coil 20b.

Furthermore, since pressure applied to the projections 23a–23f is dispersed widely, the holding cylinder 2 can be free from the possibility of damage even when a large pressure is applied to the projections 23a–23f during holding the holding cylinder 2 in the sensor housing 5. Accordingly, the holding cylinder 2 can be pressed into the sensor housing 5 with a large force, so that the torque detecting apparatus can be attached in a stable manner.

Still further, since the projections 23a–23f are formed of elastic bodies having an elasticity modulus smaller than that of metal, pressure applied to the holding cylinder 2 due to deformation of the projections 23a–23f is small even when, for example, the sensor housing 5 contracts at low temperature, so that deformation of the holding cylinder 2 can be suppressed. Accordingly, a change in the detected value of torque due to deformation of the sensor housing 5 for supporting the holding cylinder 2 can be suppressed, and accurate torque detection can be effected.

Still further, since the projections 23a–23f are shaped as strips parallel to the axis of the holding cylinder 2, the stress applied from the projections 23a–23f to the holding cylinder 2 is distributed in the axial direction of the holding cylinder 2 and deformation of the holding cylinder 2 due to stress concentration can be suppressed, so that further accurate torque detection can be effected.

It should be noted that the positions where projections are formed are not limited to those described in this embodiment, and the projections can be formed at axial portions which do not have recesses. For example, projections may be provided on the outer circumference of the intermediate and at an outer circumferential portion having a decreased inside diameter at end portions of the holding cylinder. In this case, the holding cylinder can be fitted fixedly to the sensor housing in a further stable manner.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A torque detecting apparatus, comprising:
an input shaft to which a torque is inputted;
an output shaft for outputting the torque inputted into the input shaft;
a connecting shaft for connecting the input shaft and the output shaft to transmit the torque;
a coil for detecting a torque applied to the connecting shaft based on a torsional angle which arises at the connecting shaft; and
a holding cylinder for holding the coil coaxially,
wherein the holding cylinder has inside thereof a recess extending in a circumferential direction, the coil is fitted in the recess, and the holding cylinder has a projection on an outer surface of an axial portion which does not have the recess.

2. The torque detecting apparatus according to claim 1, wherein
the holding cylinder has a plurality of projections which are arranged at regular intervals in the circumferential direction of the holding cylinder.

3. A torque detecting apparatus, comprising:
an input shaft to which a torque is inputted;
an output shaft for outputting the torque inputted into the input shaft;
a connecting shaft for connecting the input shaft and the output shaft to transmit the torque;
a coil for detecting a torque applied to the connecting shaft based on a torsional angle which arises at the connecting shaft;
a compensating coil for applying temperature compensation to torque detection by the coil; and
a holding cylinder for holding, respectively, the coil and the compensating coil coaxially,
wherein the holding cylinder has inside thereof two recesses extending in a circumferential direction, the coil is fitted in one of the recesses, the compensating coil is fitted in the other of the recesses, and the holding cylinder has a projection on an outer surface of an axial portion which separates the two recesses.

4. The torque detecting apparatus according to claim 3, wherein
the holding cylinder has a plurality of projections which are arranged at regular intervals in the circumferential direction of the holding cylinder.

5. The torque detecting apparatus according to claim 3, wherein
the holding cylinder includes a hollow and disciform intermediate and two cylinder portions sandwiching the intermediate coaxially, the intermediate constituting the axial portion which separates the two recesses.

6. The torque detecting apparatus according to claim 5, wherein
the holding cylinder has a plurality of projections which are arranged at regular intervals in the circumferential direction of the holding cylinder.

* * * * *